US012312226B2

(12) United States Patent
Jones

(10) Patent No.: US 12,312,226 B2
(45) Date of Patent: May 27, 2025

(54) WINE BOTTLE OPENING DEVICE

(71) Applicant: Cheryl Jones, Cushing, OK (US)

(72) Inventor: Cheryl Jones, Cushing, OK (US)

( * ) Notice: Subject to any disclaimer, the term of this patent is extended or adjusted under 35 U.S.C. 154(b) by 0 days.

(21) Appl. No.: 18/406,361

(22) Filed: Jan. 8, 2024

(65) Prior Publication Data

US 2025/0011149 A1 Jan. 9, 2025

Related U.S. Application Data

(60) Provisional application No. 63/511,763, filed on Jul. 3, 2023.

(51) Int. Cl.
*B67B 7/44* (2006.01)
*B67B 7/04* (2006.01)
*B67B 7/16* (2006.01)

(52) U.S. Cl.
CPC .............. *B67B 7/44* (2013.01); *B67B 7/0411* (2013.01); *B67B 7/16* (2013.01)

(58) Field of Classification Search
CPC B67B 7/0411; B67B 7/16; B67B 7/44; B25B 7/02
See application file for complete search history.

(56) References Cited

U.S. PATENT DOCUMENTS 1,194,296 A * 8/1916 Jones ........................ B67B 7/44 7/168
1,934,118 A 11/1933 Draper
2,586,214 A 2/1952 Fay
2,811,062 A 10/1957 Robertson
2,823,395 A * 2/1958 Brownson ................. B67B 7/44 7/128
3,722,327 A 3/1973 Strassel
5,862,720 A * 1/1999 McNellis ................ B67B 7/066 81/424.5
6,289,768 B1 * 9/2001 Anderson ................. B25F 1/04 7/128
6,578,221 B2 * 6/2003 Ping ........................ B25F 1/003 7/128
6,622,327 B1 * 9/2003 Rivera .................. B26B 11/008 7/128
6,957,466 B2 * 10/2005 Rivera ...................... B25F 1/04 7/128
9,670,043 B2 6/2017 Blanchard
11,938,599 B1 * 3/2024 Foss ........................ B25B 7/123
2019/0381647 A1 * 12/2019 Lazenby ................... B67B 7/44
2020/0189894 A1 * 6/2020 Caraciobanu ............. B67B 7/44
2021/0122022 A1 * 4/2021 Lazenby ................. B25F 1/003
2023/0249321 A1 * 8/2023 Purnomohadi ......... B25F 1/003 81/304
2024/0198493 A1 * 6/2024 Alvarado ................ B25B 7/123

* cited by examiner

*Primary Examiner* — Eyamindae C Jallow
(74) *Attorney, Agent, or Firm* — Brennan, Manna & Diamond, LLC

(57) ABSTRACT

A wine bottle opening device is provided. The device is comprised of a wine bottle opening device with a set of adjustable spring jaws. The jaws can be adjusted around a wine bottle cork or cap to facilitate easy removal. The device may also be comprised of an integrated corkscrew and an integrated bottle opener.

20 Claims, 2 Drawing Sheets

WINE BOTTLE OPENING DEVICE

CROSS-REFERENCE TO RELATED APPLICATION

The present application claims priority to, and the benefit of, U.S. Provisional Application No. 63/511,763, which was filed on Jul. 3, 2023, and is incorporated herein by reference in its entirety.

FIELD OF THE INVENTION

The present invention relates generally to the field of wine bottle opening devices. More specifically, the present invention relates to a wine bottle opening device that provides a set of spring jaws that can be used to easily remove a cork and/or cap from a wine bottle. Accordingly, the present disclosure makes specific reference thereto. Nonetheless, it is to be appreciated that aspects of the present invention are also equally applicable to other like applications, devices, and methods of manufacture.

BACKGROUND

Opening wine bottles and other beverage items sealed with a cork can be difficult to open, particularly for individuals with limited physical strength and dexterity. The task of extracting a cork from a bottle requires a certain amount of finesse, and when faced with restricted mobility or reduced hand coordination, may be difficult or impossible. Further, attempting to exert extra force in order to achieve better leverage on the bottle to remove a cork or a cap can inadvertently result in the bottle slipping and cracking/shattering. This can lead to spilled wine which is a frustrating and time-consuming cleanup process. Further, if the bottle shatters upon impact, shards of broken glass can be strewn about. This not only creates an even greater mess to clean and also poses a safety hazard.

Therefore, there exists a long-felt need in the art for a device that allows a user to easily open a wine bottle. There also exists a long-felt need in the art for a wine bottle opening device. More specifically, there exists a long-felt need in the art for a wine bottle opening device that allows a user to easily open a corked and/or twist-cap wine bottle. Furthermore, there exists a long-felt need in the art for a wine bottle opening device that allows a user to easily open a corked and/or twist-cap wine bottle wherein the device reduces the chance of the wine bottle slipping during the uncorking or cap-removing process.

The subject matter disclosed and claimed herein, in one embodiment thereof, comprises a wine bottle opening device. The device is comprised of a wine bottle opening device with a set of adjustable spring jaws that can be adjusted around a wine bottle cork or cap to facilitate easy removal. The device may also be comprised of an integrated corkscrew and an integrated bottle opener.

In this manner, the wine bottle opening device of the present invention accomplishes all the foregoing objectives and provides a device that allows a user to easily open a wine bottle. More specifically, the device allows a user to easily open a corked and/or twist cap wine bottle via the jaws of the device, which reduces the chance of the wine bottle slipping during the uncorking or cap-removing process. Further, the corkscrew and bottle opener of the device provide additional useful functionality.

SUMMARY

The following presents a simplified summary to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a wine bottle opening device. The device is comprised of a vise-grip plier-like device that can be used to open a wine bottle. More specifically, the device is comprised of a fixed jaw comprised of at least one tooth that improves the grip of the jaw on a wine bottle. The device is further comprised of a movable jaw comprised of at least one tooth that improves the grip of the jaw on a wine bottle. The movable jaw is comprised of a movable handle that moves relative during the fixed handle to open/close the jaws around a wine bottle.

The handles are connected by at least one connecting rod. The jaws may also be attached via at least one tension spring that creates tension between the jaws. The jaws may also be connected via at least one rivet link that allows the jaws to pivot. The distance between the jaws can be adjusted via turning at least one adjusting bolt. The bolt may be comprised of at least one corkscrew stored within the bolt. Once the jaws are grasped around a wine bottle, the jaws can be released via at least one release lever.

The present invention is also comprised of a method of using the device. First, a device is provided comprised of a fixed handle comprised of a fixed jaw, a movable jaw comprised of a movable handle—wherein the movable jaw and movable handle attach to the fixed jaw and fixed handle, a spring, a connecting rod, a release lever, a bottle opener, and a corkscrew. Then, the distance between the fixed jaw and movable jaw can be reduced such that the jaws contact both sides of a wine cap via an adjusting bolt of the device. Then, the movable jaw can be squeezed to lock the jaws in said position. Next, the device can be rotated clockwise or counterclockwise to remove a cap from a wine bottle. After the cap is removed, a release lever of the device can be depressed to release the jaws from around the cap. In addition, the corkscrew can be removed from the adjusting bolt and can then be used to uncork a wine bottle. Furthermore, at least one bottle opener of the device can be used to open a capped wine bottle or beer bottle.

Accordingly, the wine bottle opening device of the present invention is particularly advantageous as it provides a device that allows a user to easily open a wine bottle. More specifically, the device allows a user to easily open a corked and/or twist cap wine bottle via the jaws of the device, which reduces the chance of the wine bottle slipping during the uncorking or cap-removing process. Further, the corkscrew and bottle opener of the device provide additional useful functionality. In this manner, the wine bottle opening device overcomes the limitations of existing wine bottle opening methods and devices known in the art.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
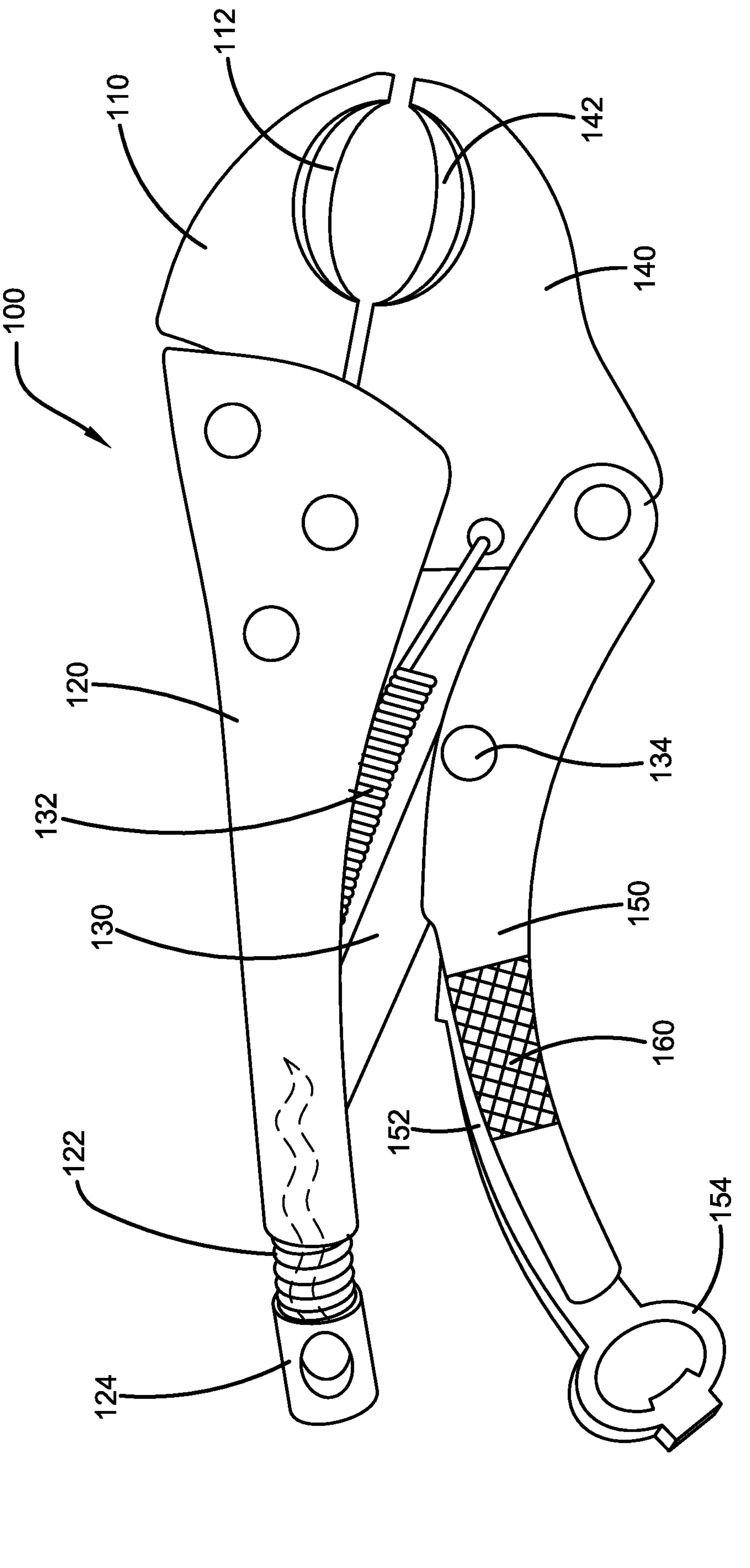
FIG. 1 illustrates a side view of one potential embodiment of a wine bottle opening device of the present invention in accordance with the disclosed architecture.

The innovation is now described with reference to the drawings, wherein like reference numerals are used to refer to like elements throughout. In the following description, for purposes of explanation, numerous specific details are set forth to provide a thorough understanding thereof. It may be evident, however, that the innovation can be practiced without these specific details. In other instances, well-known structures and devices are shown in block diagram form to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for a device that allows a user to easily open a wine bottle. There also exists a long-felt need in the art for a wine bottle opening device. More specifically, there exists a long-felt need in the art for a wine bottle opening device that allows a user to easily open a corked and/or twist-cap wine bottle. Furthermore, there exists a long-felt need in the art for a wine bottle opening device that allows a user to easily open a corked and/or twist-cap wine bottle wherein the device reduces the chance of the wine bottle slipping during the uncorking or cap-removing process.

The present invention, in one exemplary embodiment, is comprised of a wine bottle opening device comprised of a vise-grip plier-like device that can be used to open a wine bottle. More specifically, the device is comprised of a fixed jaw comprised of at least one tooth that improves the grip of the jaw on a wine bottle and a movable jaw comprised of at least one tooth that improves the grip of the jaw on a wine bottle. The movable jaw is comprised of a movable handle that moves relative during the fixed handle to open/close the jaws around a wine bottle.

The handles are connected by at least one connecting rod. The jaws may also be attached via at least one tension spring that creates tension between the jaws. The jaws may also be connected via at least one rivet link that allows the jaws to pivot. The distance between the jaws can be adjusted via turning at least one adjusting bolt. The bolt may be comprised of at least one corkscrew stored within the bolt. Once the jaws are grasped around a wine bottle, the jaws can be released via at least one release lever.

The present invention is also comprised of a method of using the device. First, a device is provided comprised of a fixed handle comprised of a fixed jaw, a movable jaw comprised of a movable handle wherein the movable jaw and movable handle attach to the fixed jaw and fixed handle, a spring, a connecting rod, a release lever, a bottle opener, and a corkscrew. Then, the distance between the fixed jaw and movable jaw can be reduced such that the jaws contact both sides of a wine cap via an adjusting bolt of the device. Then, the movable jaw can be squeezed to lock the jaws in said position. Next, the device can be rotated clockwise or counterclockwise to remove a cap from a wine bottle. After the cap is removed, a release lever of the device can be depressed to release the jaws from around the cap. In addition, the corkscrew can be removed from the adjusting bolt and can then be used to uncork a wine bottle. Furthermore, at least one bottle opener of the device can be used to open a capped wine bottle or beer bottle.

Accordingly, the wine bottle opening device of the present invention is particularly advantageous as it provides a device that allows a user to easily open a wine bottle. More specifically, the device allows a user to easily open a corked and/or twist cap wine bottle via the jaws of the device, which reduces the chance of the wine bottle slipping during the uncorking or cap-removing process. Further, the corkscrew and bottle opener of the device provide additional useful functionality. In this manner, the wine bottle opening device overcomes the limitations of existing wine bottle opening methods and devices known in the art.

Referring initially to the drawings, FIG. 1 illustrates a side view of one potential embodiment of a wine bottle opening device 100 of the present invention in accordance with the disclosed architecture. The device 100 is comprised of a vise-grip plier-like device that can be used to open a wine bottle.

The device 100 is comprised of a fixed jaw 110. The fixed jaw 110 may be comprised of at least one tooth 112 that improves the grip of the jaw 110 on a wine bottle. The tooth 112 may be made from a rubber material in one embodiment to improve grip and to prevent against damaging a wine bottle. The fixed jaw 110 is attached to a fixed handle 120.

The device 100 is further comprised of a movable jaw 140. The movable jaw 140 may be comprised of at least one tooth 142 that improves the grip of the jaw 140 on a wine bottle. The tooth 142 may be made from a rubber material in one embodiment to improve grip and to prevent against damaging a wine bottle. The movable jaw 140 is comprised of a movable handle 150 that moves relative during the fixed handle 120 to open/close the jaws 110, 140 around a wine bottle.

The handles 120, 150 are connected by at least one connecting rod 130. The jaws 110, 140 may also be attached via at least one tension spring 132 that creates tension between the jaws 110, 140. The jaws 110, 140 may also be connected via at least one rivet link 134 that allows the jaws 110, 140 to pivot.

The distance between the jaws 110, 140 can be adjusted via turning at least one adjusting bolt 122. In this manner, the movable jaw 140 can be used closer or farther away from the fixed jaw 110 to accommodate different sizes of wine bottles. The bolt 122 is preferably threaded. The bolt 122 may be comprised of at least one corkscrew 124 stored within the bolt 122. The corkscrew 124 can be removed from the bolt 122 as needed to remove a cork from a wine bottle. The corkscrew 124 preferably attaches to the bolt 122 in a threaded manner.

Once the jaws 110, 140 are grasped around a wine bottle, the jaws 110, 140 can be released via at least one release lever 152. The release lever 152 releases the spring 132 to open the jaws 110, 140. The release lever 152 and/or handle 150 may be comprised of at least one bottle opener 154 of any type known in the art.

Each handle 120, 150 may also be comprised of at least one grip 160. The grip 160 further increases the grip of each handle 120, 150. The grip 160 is preferably comprised of a non-slip material such as, but not limited to, rubber. The grip 160 may be comprised of a raised or a recessed texture to further increase grip.

Figure 2:
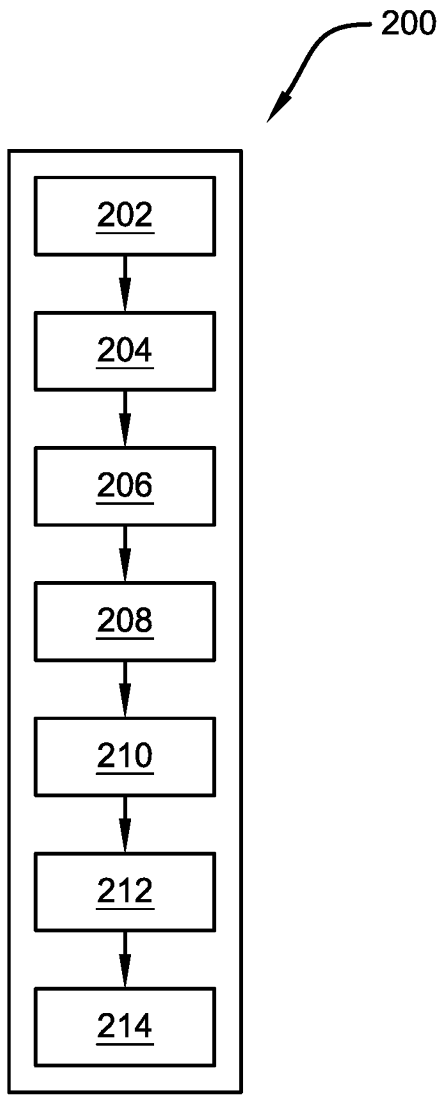
FIG. 2 illustrates a flowchart of a method of using one potential embodiment of a wine bottle opening device of the present invention in accordance with the disclosed architecture.

The present invention is also comprised of a method of using 200 the device 100, as seen in FIG. 2. First, a device 100 is provided comprised of a fixed handle 120 comprised of a fixed jaw 110, a movable jaw 140 comprised of a movable handle 150 wherein the movable jaw 140 and movable handle 150 attach to the fixed jaw 110 and fixed handle 120, a spring 132, a connecting rod 130, a release lever 152, a bottle opener 154, and a corkscrew 124 [Step 202]. Then, the distance between the fixed jaw 110 and movable jaw 140 can be reduced such that the jaws 110, 140 contact both sides of a wine cap via an adjusting bolt 122 of the device 100 [Step 204]. Then, the movable jaw 140 can be squeezed to lock the jaws 140, 110 in said position [Step 206]. Next, the device 100 can be rotated clockwise or counterclockwise to remove a cap from a wine bottle [Step 208]. After the cap is removed, a release lever 152 of the device 100 can be depressed to release the jaws 140, 110 from around the cap [Step 210]. In addition, the corkscrew 124 can be removed from the adjusting bolt 122 and can then be used to uncork a wine bottle [Step 212]. Furthermore, at least one bottle opener 154 of the device 100 can be used to open a capped wine bottle or beer bottle [Step 214].

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "wine bottle opening device" and "device" are interchangeable and refer to the wine bottle opening device 100 of the present invention.

Notwithstanding the foregoing, the wine bottle opening device 100 of the present invention and its various components can be of any suitable size and configuration as is known in the art without affecting the overall concept of the invention, provided that they accomplish the above-stated objectives. One of ordinary skill in the art will appreciate that the size, configuration, and material of the wine bottle opening device 100 as shown in the FIGS. are for illustrative purposes only, and that many other sizes and shapes of the wine bottle opening device 100 are well within the scope of the present disclosure. Although the dimensions of the wine bottle opening device 100 are important design parameters for user convenience, the wine bottle opening device 100 may be of any size, shape, and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A wine bottle opening device comprising:
- a fixed handle comprised of a fixed jaw;
- a movable handle comprised of a movable jaw, the movable handle attached to the fixed handle via a spring, a rivet link, and a connecting rod;
- a release lever;
- an adjusting bolt;
- a corkscrew; and
- a bottle opener.

2. The wine bottle opening device of claim 1, wherein the fixed jaw is comprised of a first tooth.

3. The wine bottle opening device of claim 2, wherein the first tooth is comprised of a rubber material.

4. The wine bottle opening device of claim 1, wherein the movable jaw is comprised of a second tooth.

5. The wine bottle opening device of claim 4, wherein the second tooth is comprised of a rubber material.

6. The wine bottle opening device of claim 1, wherein the adjusting bolt increases or decreases the distance between the fixed jaw and the movable jaw.

7. The wine bottle opening device of claim 1, wherein the corkscrew threadedly attaches to the adjusting bolt.

8. A wine bottle opening device comprising:
- a fixed handle comprised of a fixed jaw;
- a movable handle comprised of a movable jaw, the movable handle attached to the fixed handle via a spring, a rivet link, and a connecting rod;
- a release lever;
- an adjusting bolt;
- a corkscrew attached to the adjusting bolt; and
- a bottle opener attached to the movable handle.

9. The wine bottle opening device of claim 8, wherein the fixed jaw is comprised of a first tooth.

10. The wine bottle opening device of claim 9, wherein the first tooth is comprised of a rubber material.

11. The wine bottle opening device of claim 8, wherein the movable jaw is comprised of a second tooth.

12. The wine bottle opening device of claim 11, wherein the second tooth is comprised of a rubber material.

13. The wine bottle opening device of claim 8, wherein the adjusting bolt increases or decreases the distance between the fixed jaw and the movable jaw.

14. The wine bottle opening device of claim 8, wherein the corkscrew threadedly attaches to the adjusting bolt.

15. A method of using a wine bottle opening device, the method comprising the following steps:
- providing a wine bottle opening device comprised of a fixed handle comprised of a fixed jaw, a movable jaw comprised of a movable handle;
- wherein the movable jaw and the movable handle attach to the fixed jaw and the fixed handle, a spring, a connecting rod, a release lever, a bottle opener, and a corkscrew;
- reducing a distance between the fixed jaw and the movable jaw via an adjusting bolt such that the fixed jaw and the movable jaw contact a side of wine bottle cap;
- squeezing the movable jaw to lock the fixed jaw and the movable jaw around the wine bottle cap;

rotating the wine bottle opening device to remove the wine bottle cap from a wine bottle; and depressing a release lever to release the fixed jaw and the movable jaw from around the wine bottle cap.

16. The method of using a wine bottle opening device of claim 15 comprised of a step of removing the corkscrew from the adjusting bolt.

17. The method of using a wine bottle opening device of claim 15 comprised of a step of removing a cork from a wine bottle using the corkscrew.

18. The method of using a wine bottle opening device of claim 15 comprised of a step of using the bottle opener to remove a cap from a bottle.

19. The method of using a wine bottle opening device of claim 15, wherein the fixed jaw and the fixed handle are attached to the movable jaw and the movable handle by the spring.

20. The method of using a wine bottle opening device of claim 15, wherein the fixed jaw and the fixed handle are attached to the movable handle by the connecting rod.

* * * * *